United States Patent
Park et al.

(10) Patent No.: US 9,690,138 B2
(45) Date of Patent: Jun. 27, 2017

(54) RETARDATION FILM, MANUFACTURING METHOD THEREOF, AND LIQUID CRYSTAL DISPLAY DEVICE INCLUDING THE SAME

(75) Inventors: Jun-Wuk Park, Daejeon-si (KR); Jeong-Min Choi, Daejeon-si (KR); Nam-Jeong Lee, Daejeon-si (KR)

(73) Assignee: LG CHEM, LTD., Seoul (KR)

(*) Notice: Subject to any disclaimer, the term of this patent is extended or adjusted under 35 U.S.C. 154(b) by 122 days.

(21) Appl. No.: 14/130,874

(22) PCT Filed: Jul. 2, 2012

(86) PCT No.: PCT/KR2012/005248
§ 371 (c)(1), (2), (4) Date: Jan. 3, 2014

(87) PCT Pub. No.: WO2013/005964
PCT Pub. Date: Jan. 10, 2013

(65) Prior Publication Data
US 2014/0125926 A1    May 8, 2014

(30) Foreign Application Priority Data

Jul. 6, 2011 (KR) .................. 10-2011-0066960

(51) Int. Cl.
- *G02F 1/13363* (2006.01)
- *G02B 5/30* (2006.01)
- *G02B 5/32* (2006.01)

(52) U.S. Cl.
CPC ....... *G02F 1/13363* (2013.01); *G02B 5/3083* (2013.01); *G02B 5/32* (2013.01); *G02F 1/133634* (2013.01); *Y10T 428/105* (2015.01); *Y10T 428/1036* (2015.01)

(58) Field of Classification Search
CPC ..... G02B 5/3083; G02B 5/32; G02F 1/13363; G02F 1/133634; G02F 2413/02; G02F 2413/11; Y10T 428/1036; Y10T 428/105; Y10T 428/3179

USPC ......................................... 428/1.33
See application file for complete search history.

(56) References Cited

U.S. PATENT DOCUMENTS

| | | | | |
|---|---|---|---|---|
| 2,189,337 A | * | 2/1940 | Bass .................. | C08K 5/06 106/193.1 |
| 5,599,872 A | * | 2/1997 | Sulewski ............ | C09J 133/066 524/517 |
| 7,875,328 B2 | | 1/2011 | Um et al. | |
| 2001/0030726 A1 | * | 10/2001 | Yoshida ............ | G02F 1/133634 349/117 |
| 2008/0218666 A1 | * | 9/2008 | Toyooka .......... | G02F 1/133528 349/96 |
| 2009/0273838 A1 | * | 11/2009 | Um ................. | G02B 5/3083 359/489.2 |
| 2010/0053508 A1 | * | 3/2010 | Choi ................ | G02F 1/133634 349/96 |
| 2011/0268895 A1 | | 11/2011 | Jung et al. | |

FOREIGN PATENT DOCUMENTS

| | | | |
|---|---|---|---|
| CN | 102015848 A | 4/2011 | |
| GB | 798806 A * | 7/1958 | ............... C08F 8/00 |
| JP | 2009288334 A | 10/2009 | |
| KR | 1020090090553 A | 8/2009 | |
| KR | 1020090115041 A | 11/2009 | |
| KR | 1020100138222 A | 12/2010 | |
| WO | 2010-151065 A2 | 12/2010 | |

* cited by examiner

*Primary Examiner* — Sophie Hon
(74) *Attorney, Agent, or Firm* — Dentons US LLP

(57) ABSTRACT

There are provided a retardation film, a manufacturing method thereof, and a liquid crystal display device including the same. The retardation film includes 1) an acrylic film, 2) a coating layer of a negative C-type material, and 3) a primer layer including a copolymer containing an aromatic vinyl-based unit and a maleic acid-based unit, provided between the acrylic film and the coating layer of the negative C-type material. The retardation film may be used in an in-plane switching mode liquid crystal display device.

15 Claims, No Drawings

RETARDATION FILM, MANUFACTURING METHOD THEREOF, AND LIQUID CRYSTAL DISPLAY DEVICE INCLUDING THE SAME

This application is a national stage application of International Application No. PCT/KR2012/005248, filed on Jul. 2, 2012, which claims priority to and the benefit of Korean Patent Application No. 10-2011-0066960, filed in the Korean Intellectual Property Office on Jul. 6, 2011, the entire content of which is incorporated herein by reference.

TECHNICAL FIELD

Aspects of embodiments relate to a retardation film, a manufacturing method thereof, and a liquid crystal display device including the same.

BACKGROUND ART

Display technology using various schemes such as plasma display panels (PDPs), liquid crystal displays (LCDs) and the like, replacing cathode-ray tubes, according to the related art, has been proposed and has come onto the market based on recent developments in optical technology. The demand for polymer materials for the displays as described above has increased. For example, in the case of a liquid crystal display, as slimness, lightness, and relatively large screen areas are required, wide viewing angles, high amounts of contrast, suppression of a change in an image color based on a viewing angle and equalization of a screen display are particularly important issues.

Therefore, several types of polymer films have been used for polarizing films, retardation films, plastic substrates, light guard plates, and the like.

In liquid crystal displays, various modes such as a double domain twisted nematic (TN) mode, a super twisted nematic (STN) mode, an axially symmetric aligned microcell (ASM) mode, an optically compensated blend (OCB) mode, a vertical alignment (VA) mode, a multidomain VA (MVA) mode, a surrounding electrode (SE) mode, a patterned VA (PVA) mode, an in-plane switching (IPS) mode, a fringe-field switching (FFS) mode, and the like may be used. The modes as described above show respective inherent liquid crystal array properties and optical anisotropy followed thereby, depending on a liquid crystal type, and these may be main factors causing a relatively narrow viewing angle in a liquid crystal display. That is, in order to improve a viewing angle, liquid crystal optical anisotropy needs to be appropriately compensated for, and to this end, and a retardation film corresponding to a respective mode is required. Among the modes described above, in the case of a liquid crystal display in an IPS mode, since a horizontal alignment liquid crystal is used, optical anisotropy at an inclination angle in a non-driving state is not as great as compared to that in other modes, and therefore, it has been known that a comparatively wide viewing angle may be secured by only using an isotropic protective film. However, in this case, since compensation for an absorption axis of a polarizer at the inclination angle is not performed, degradation in contrast and modulation in color depending on a viewing angle may occur, and thus, in order to secure a wide viewing angle, a retardation film suitable for an IPS mode liquid crystal display should be used.

In order to perform the compensation for an IPS mode, a retardation compensation layer satisfying the condition of $n_x > n_z > n_y$ is required. Here, $n_x$, $n_y$, $n_z$ represent respective refractive indexes in respective film directions, and x, y and z directions respectively refer to a direction in which a refractive index is highest on a film surface, a direction in which a refractive index is lowest on a film surface, and a thickness direction. However, it is known that the retardation compensation layer satisfying the condition of $n_x > n_z > n_y$ may be difficult to be implemented while only using a monoaxially stretched film or a biaxially stretched film. Therefore, in order to form a retardation compensation layer satisfying the refractive index condition, several schemes for three-dimensionally controlling a refractive index, for example, a method of inducing excessive width contraction at the time of performing stretching using a shrink film according to the related art, a method of applying a strong electrical field to a stretched film, and the like, have been proposed, but a limitation in consecutively producing wide width films has been present, due to several technical and equipment problems to date.

Accordingly, as a retardation film for an IPS mode, a structure configured of a multilayer film having two or more layers has been practically suggested, and for example, structure such as A-plate/(+)C-plate, (+)B-plate/(−)C-plate, and the like may be used. In terms of materials, respective layers may be configured of a stretched polymer film, a liquid crystal organic coating layer, a retardation representation polymer coating layer, organic and inorganic composite materials, and the like. As a method of configuring such a multilayer composite film, several methods using, for example, multilayer extrusion, adhesion, direct coating, thermal lamination and the like, may be used. However, the implementation of the multilayer extrusion method has relatively significant technical and equipment difficulties in terms of adjusting respective layer retardation, and in the lamination method using an adhesive, films of respective layers need to be separately manufactured and then subjected to several processes such as adhesion, drying and the like, such that manufacturing costs are increased, and the occurrence of defects such as staining, local surface irregularities or mixing of foreign objects, and the like due to the use of an adhesive may increase.

In the case of the direct coating or high-temperature thermal lamination, a retardation value thereof may be easily altered due to a high temperature or erosion by an organic solvent or the like, depending on materials, and thus, a range of applications thereof is not very large, and in the case of direct coating, a usable base film has limitations. In order to directly coat a stretched film with a retardation material, solvent resistance of a base film may be more important, and in the case of a cellulose or olefin-based retardation film, since solvent resistance thereof is comparatively excellent, the method of directly coating a base film may be used, but a retardation expression range is different such that it may be difficult to use the films for an IPS mode. In addition, in the case of an acrylic or styrene-based retardation film, since such films may have little resistance to general-purpose organic solvents, for example, an aromatic hydrocarbon solvent such as toluene, xylene, or the like, a ketone-based solvent such as acetone, methyl ethyl ketone or the like, an organochlorine solvent such as dichloromethane, chloroform or the like, and the like, when the coating is performed using a coating agent containing the solvents as described above, since adhesion defects, along with increases in brittleness and defective retardation and staining properties may occur, there are significant limitations in selecting a coating agent. Therefore, research into, and the development of, a retardation film having excellent adhesion at an interface between an acrylic film and a coating agent while having excellent organic solvent blocking properties are required.

DISCLOSURE

Technical Problem

An aspect of an embodiment provides a retardation film for an IPS mode having relatively low manufacturing costs and a relatively low defect rate while having an excellent production yield, and a method of manufacturing the same.

Technical Solution

An aspect of an embodiment provides a retardation film including: 1) an acrylic film, 2) a coating layer of a negative C-type material, and 3) a primer layer including a copolymer containing an aromatic vinyl-based unit and a maleic acid-based unit, provided between the acrylic film and the coating layer of the negative C-type material.

An aspect of an embodiment provides a method of manufacturing a retardation film including: a) preparing an acrylic film, b) forming a primer layer by coating at least one surface of the acrylic film with a composition including a copolymer containing an aromatic vinyl-based unit and a maleic acid-based unit, and c) coating an upper part of the primer layer with a negative C-type material.

An aspect of an embodiment provides a liquid crystal display device including the retardation film described above.

Advantageous Effects

As set forth above, in a retardation film according to an embodiment of the inventive concept, a primer layer including a copolymer containing an aromatic vinyl-based unit and a maleic acid-based unit may be provided between an acrylic film and a coating layer of a negative C-type material, and the integration thereof may be implemented by a direct coating method, such that improvements in heat resistance and durability, simplifications and sliming of products, and simplifications in terms of quality management may be obtained. In addition, since the retardation film according to the embodiment may be directly bonded to a PVA polarizing element, a process may be simplified, thereby reducing material and process costs.

BEST MODE FOR INVENTION

Hereinafter, embodiments will be described in detail. According to an embodiment of the inventive concept, a retardation film may include 1) an acrylic film, 2) a coating layer of a negative C-type material, and 3) a primer layer including a copolymer containing an aromatic vinyl-based unit and a maleic acid-based unit, provided between the acrylic film and the coating layer of the negative C-type material.

In the retardation film according to the embodiment, 1) the acrylic film may be manufactured by producing a film using an acrylic polymer through a melting extrusion method or a solution cast method and then performing a stretching process thereon.

In this case, the acrylic film may be manufactured using an acrylic resin composition, and the acrylic resin may be used as long as it only contains an acrylic unit, and thus is not particularly limited. For example, the acrylic resin may be a homogeneous acrylic resin such as PMMA, may be a copolymer resin formed by copolymerizing an acrylic unit and a different type of unit, or may be a blended resin containing a resin different from an acrylic resin.

In this case, as the acrylic unit, a compound having a carbonyl group of an ester group and a double bond between conjugated carbons may be used, and a substituent thereof is not particularly limited. The acrylic unit used in an embodiment may be considered as including acrylate derivatives as well as acrylate and may include an alkyl acrylate, alkyl methacrylate, alkyl butacrylate, or the like. For example, as an example of the acrylic unit, a compound represented by the following chemical formula 1 may be included.

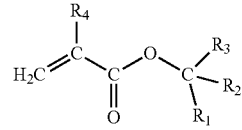

Chemical Formula 1

In chemical formula 1 above, R1, R2 and R3 indicate a hydrogen atom or monovalent hydrocarbon groups of carbon numbers 1 to 30 containing or not containing a hetero atom, respectively, independently, and at least one of R1, R2 and R3 may be an epoxy group, and R4 refers to a hydrogen atom or an alkyl group of carbon numbers 1 to 6.

In detail, the acrylic unit may be methyl methacrylate, ethyl methacrylate, propylmethacrylate, n-butyl methacrylate, t-butyl methacrylate, cyclohexylmethacrylate, benzyl methacrylate, methoxyethyl methacrylate, ethoxyethyl methacrylate, butoxymethyl methacrylate, or the like, but should not be considered to be limited thereto.

On the other hand, the acrylic resin may further include a maleic acid-based unit, a maleimide-based unit, a lactone ring-containing unit, an aromatic vinyl-based unit, and a combination thereof, as well as including the acrylic unit.

In this case, the ingredients may be introduced together with the acrylic monomer in a polymerization process and be included in a form in which they are copolymerized with the acrylic monomer, or may also be included in a form in which a polymer or copolymer resin including at least one of the ingredients is blended with a polymer or copolymer including an acrylic unit. For example, the acrylic resin according to the embodiment may be a resin blend of an acrylate-maleimide copolymer resin and a styrene-maleic anhydride copolymer resin, but should not be considered to be limited thereto.

On the other hand, as a detailed example of the maleic acid or maleimide-based unit, anhydrous maleic acid, maleimide, N-methyl maleimide, N-ethyl maleimide, N-propyl maleimide, N-isopropyl maleimide, cyclohexyl maleimide, or the like may be used, but the inventive concept should not be considered as being limited thereto. In the case of including the maleic acid-based unit, the maleimide-based unit, the lactone ring-containing unit or the like, heat resistance in the acrylic film may be improved.

As a detailed example of the aromatic vinyl-based unit, a styrene, α-methylstyrene, 4-methylstyrene, or the like may be used, but is not limited thereto. When the aromatic vinyl-based unit as described above is included, an inherent birefringence of the resin itself may be increase, and as a result, a retardation value required by a compensation film for an IPS mode may be easily implemented. At this time, the aromatic vinyl-based unit may be included in a form in which it is copolymerized with the acrylic monomer or may be included in a form in which a polymer resin or a copolymer resin containing the aromatic vinyl-based unit is blended with an acrylic resin. As the polymer or copolymer resin containing an aromatic vinyl-based unit, commercially used products may be used, and for example, a styrene-maleic anhydride copolymer (SMA), a styrene-acrylonitrile copolymer (SAN), an α-methyl styrene-acrylonitrile copolymer (AMSAN), or the like may be used, but the inventive concept should not be considered to be limited thereto. In order to obtain IPS compensation, the content of the aromatic vinyl-based unit may be about 5 to 30 wt %, and more in detail, may be 10 to 25 wt %, to the entire resin composition.

1) The acrylic film as above may be manufactured by forming a film using the foregoing constituent ingredients and then uniaxially or biaxially stretching the film. The film formation method or the uniaxial or biaxial stretching method is not particularly limited and commonly known methods may be used.

In the retardation film according to the embodiment, a retardation value $R_{in}$ of 1) the acrylic film described above in an in-plane direction thereof, represented by the following equation 1, may be 50 to 200 nm, and a retardation value $R_{th}$ of 1) the acrylic film described above in a thickness direction thereof, represented by the following equation 2, may be 50 to 250 nm.

$$R_{in}=(n_x-n_y)\times d \quad \text{Equation 1}$$

$$R_{th}=(n_z-n_y)\times d \quad \text{Equation 2}$$

In equations 1 and 2 above, $n_x$ refers to the highest refractive index among refractive indexes in the in-plane direction of the film, $n_y$ refers to a refractive index in a direction perpendicular to the $n_x$ direction among refractive indexes in the in-plane direction of the film, $n_z$ refers to a refractive index in the thickness direction of the film, and d refers to a thickness of the film.

In the retardation film according to the embodiment, a thickness of 1) the acrylic film may be 30 to 100 μm, but should not be considered to be limited thereto.

In the retardation film according to the embodiment, 2) the coating layer of a negative C-type material as described above may include a polymer compound comprising an aromatic ring, cyclo-olefin or glucose in a main chain thereof, a compound having liquid crystalline properties, a layered inorganic crystal, or the like. However, in consideration of solubility to universal solvent, retardation expression characteristics, material costs and the like, a cellulose derivate including glucose may be used. For example, ethyl cellulose having relatively excellent solubility in solvents, which do not affect an acrylic base film, such as ethanol, propanol, or the like, may be used.

Here, the ethyl cellulose resin may have a weight-average molecular weight ranging from 100,000 to 300,000 and may have 40 to 50% of ethoxyl content. When the weight average molecular weight is less than 100,000, retardation expression characteristics due to coating may sharply decrease, and when exceeding 300,000, the retardation expression characteristics may be excellent, but viscosity may be relatively high, such that it may be difficult to perform coating. In addition, when the ethoxyl content is less than 40%, solubility in an alcohol-based organic solvent may be deteriorated.

2) The coating layer of the negative C-type material may further include various additives and different polymers in order to impart adhesion properties, heat resistance, durability, scratch resistance, oxidation preventing properties, antistatic properties, or the like. In this case, in order to express retardation characteristics, the content of ethyl cellulose resin may be 50 wt % or more to the entire solid except for solvent.

In addition, a solvent contained at the time of manufacturing 2) the coating layer of the negative C-type material is not particularly limited. For example, aromatic hydrocarbons such as toluene, xylene or the like, alcohols such as ethanol, propanol, butanol or the like, acetates and the like may be mixed with each other at a predetermined ratio to then be used, in consideration of solubility, coating properties, drying capability, storage stability and the like. However, when the solvent is a strong solvent such as a hydrocarbon, an acetate, or the like, with regard to the acrylic film, the solvent may be 60 wt % or less to the entire solvent weight %.

A method of forming 2) the coating layer of the negative C-type material is not particularly limited, but in terms of a continuous process and a coating thickness, a slot dye coating process, a comma coating process or the like may be used. A drying process performed after the coating process is not particularly limited, but the drying process may be performed using hot air at a temperature of 50 to 100° C. at which a retardation value of the acrylic film is not changed, for 1 to 10 minutes.

In the retardation film according to the embodiment, 2) the coating layer of the negative C-type material may only be present on a single surface of 1) the acrylic film or may also be present on both surfaces thereof.

In the retardation film according to the embodiment, 2) the coating layer of the negative C-type material may have a retardation value $R_{in}$ of −5 to 5 nm in an in-plane direction thereof, represented by equation 1 above, and may have a retardation value $R_{th}$ of −30 to −200 nm in a thickness direction thereof, represented by equation 2 above.

In the retardation film according to the embodiment, 2) the coating layer of the negative C-type material may have a thickness ranging from 3 to 20 μm, but should not be considered to be limited thereto.

In the retardation film according to the embodiment, 3) the primer layer may include a copolymer containing an aromatic vinyl-based unit and a maleic acid-based unit and be provided between 1) the acrylic film and 2) the coating layer of the negative C-type material.

3) The primer layer needs to have excellent interface adhesion with 2) the coating layer of the negative C-type material as well as with 1) the acrylic film. In addition, a solvent containing at the time of forming 3) the primer layer should not affect 1) the acrylic film or the like. Further, 3) the primer layer needs to have good solvent barrier properties such that 1) the acrylic film is not affected by the solvent contained therein at the time of forming 2) the coating layer of the negative C-type material, should have no retardation value after drying, and should have excellent high temperature resistance, moisture resistance, and the like.

As a detailed example of the aromatic vinyl-based unit, there may be styrene, α-methylstyrene, 4-methylstyrene, and the like, and among them, for example, styrene may be used, but the inventive concept should not be considered to be limited thereto.

As the maleic acid-based unit, anhydrous maleic acid or the like may be used, but is not limited thereto.

In the case of the copolymer containing the aromatic vinyl-based unit and the maleic acid-based unit, the content of the aromatic vinyl-based unit may range from 50 to 80 mol %, and the content of the maleic acid-based unit may range from 20 to 50 mol %. In addition, a weight average molecular weight of the copolymer is not particularly limited, but a weight average molecular weight thereof may range from 50,000 to 1,000,000 in consideration of adhesion, solvent resistance, coating work properties, and the like.

The copolymer containing the aromatic vinyl-based unit and the maleic acid-based unit may be a styrene-maleic anhydride copolymer (SMA).

On the other hand, a solvent may be contained when 3) the primer layer is formed, and the solvent is not particularly limited, but alcohols such as methanol, ethanol, propanol, isopropanol and the like, not affecting the acrylic film, may be used, and a different solvent may be mixed therewith within a predetermined range in order to improve drying characteristics, storage stability, level characteristics or the like.

However, the styrene-maleic anhydride copolymer may not easily dissolve in a low molecular weight alcohol solvent such as ethanol, isopropanol or the like at room temperature. Therefore, in order to improve solubility in an alcohol-based solvent, a portion of an anhydrous maleic acid unit of the styrene-maleic anhydride copolymer forming the primer layer may be esterified using a low molecular weight alcohol such as methanol, ethanol, propanol, butanol, or the like to be ring-opened. Chemical formula 2 below is a reaction formula illustrating a ring opening reaction of the styrene-maleic anhydride copolymer.

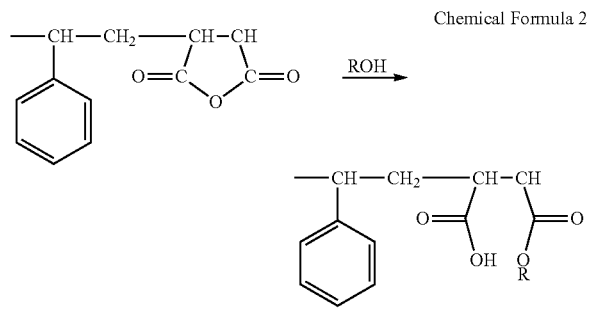

Chemical Formula 2

The ring-opening reaction as described above may also naturally occur in a process in which the styrene-maleic anhydride copolymer dissolves in a low molecular weight alcohol solvent at a relatively high temperature. As an example, about 5 to 20 wt % of the styrene-maleic anhydride copolymer may be placed in a low molecular weight alcohol solvent such as ethanol or the like and may be stirred at a temperature of 70° C. or higher for four hours or more such that a portion of the anhydrous maleic acid may be slowly esterified and thus the copolymer may be completely dissolved. In this case, in order to reduce a reaction temperature and a dissolution time, a reaction catalyst such as triethylamine or the like may be used.

In order to obtain solvent resistance and improve adhesion, 3) the primer layer may further contain a reactive monomer such as diol, diamine, diisocyanate or the like, a polyurethane or urethane acrylate-based resin, or an inorganic additive such as silica, nanoclay or the like.

Meanwhile, after the drying process is performed, the content of the copolymer containing the aromatic vinyl-based unit and the maleic acid-based unit in the primer layer may be 30 wt % or more with regard to the total weight % of the primer layer after the drying process, and in more detail, may be 40 wt % or more.

A thickness of 3) the primer layer may range from 0.1 to 5 μm, and in detail, may be 0.3 to 2 μm.

A method of forming 3) the primer layer may be a coating method, and the coating method is not particularly limited, but a gravure coating method, a wire bar coating method, or the like, in which a continuous process may be carried out may be used. A drying process performed after the coating process is not particularly limited, but the drying process may be performed using hot air at a temperature of 50 to 100° C. at which a retardation value of the acrylic base film is not changed, for 1 to 10 minutes.

The retardation film configured of the acrylic base film, the primer layer and the coating layer of the negative C-type material according to the embodiment may provide a retardation value satisfying a condition for compensation for an IPS mode, that is, satisfying $n_x > n_z > n_y$, by controlling respective retardation values of the acrylic base film (+B-plate) and the coating layer of the negative C-type material (−C-plate). A retardation value $R_{in}$ of the entire retardation film in an in-plane direction thereof may be 50 to 200 nm and in detail, may be 70 to 150 nm, and a retardation value $R_{th}$ in a thickness direction thereof needs to have a value lower than the in-plane retardation value $R_{in}$ and to be within the range of 10 to 200 nm. That is, a ratio of $R_{th}$ to $R_{in}$ ($R_{th}/R_{in}$) may range from 0.2 to 0.8, and in detail, may range from 0.3 to 0.7.

Although a thickness of the entire retardation film is not particularly limited, the thickness may range from 30 to 120 um.

In addition, a method of manufacturing a retardation film according to an embodiment may include a) preparing an acrylic film, b) forming a primer layer by coating at least one surface of the acrylic film with a composition including a copolymer containing an aromatic vinyl-based unit and a maleic acid-based unit, and c) coating an upper part of the primer layer with a negative C-type material.

In the method of manufacturing a retardation film according to the embodiment, the acrylic film used in 1) the preparing of the acrylic film, the primer layer used in b) the forming of the primer layer and the negative C-type material used in c) the coating of the primer layer are the same as the foregoing description, and thus, descriptions thereof will be omitted.

In addition, a liquid crystal display device including the retardation film as described above according to an embodiment may be provided.

The liquid crystal display device may be an in-plane switching mode liquid crystal display.

A liquid crystal display device including one, two or more retardation films as described above may be described in detail.

In a liquid crystal display device including a liquid crystal cell, and a first polarizing plate and a second polarizing plate respectively provided on both surfaces of the liquid crystal cell, a retardation film may be provided between the liquid crystal cell and the first polarizing plate and/or the second polarizing plate. That is, a retardation film may be interposed between the first polarizing plate and the liquid crystal cell or may be interposed between the second polarizing plate and the liquid crystal cell, or one, two or more retardation films may be interposed between the first polarizing plate and the liquid crystal cell and the second polarizing plate and the liquid crystal cell.

The first polarizing plate and the second polarizing plate may include a protective film on a single surface or both surfaces thereof. As the internal protective film, a triacetate cellulose (TAC) film, a polynorbornene-based film manufactured by ring opening metathesis polymerization (ROMP), an HROMP (ring opening metathesis polymerization followed by hydrogenation) polymer film obtained by hydrogenating a ring-opening polymerization cyclic olefin polymer, a polyester film, a polynorbornene-based film manufactured by addition polymerization, or the like, may be used. In addition, a film manufactured using a transparent polymer material may be used as the protective film, but is not considered to be limited thereto.

In addition, an integrated polarizing plate including a polarizer and the retardation film according to the embodiment, provided as a protective film, on a single surface or both surfaces of the polarizer, may be provided according to an embodiment.

When the retardation film according to the embodiment is only provided with a single surface of the polarizer, a well-known protective film may be provided on the other surface thereof.

As the polarizer, a film formed of polyvinyl alcohol (PVA) containing iodine or a dichroic dye may be used. Although the polarizer may be formed by adsorbing iodine or the dichroic dye on the PVA film, the manufacturing method thereof is not particularly limited. According to the embodiment of the inventive concept, the polarizer may refer to a state in which it does not include a protective film and the polarizing plate may be in a state in which it includes a polarizer and a protective film.

In the integrated polarizing plate according to the embodiment, the protective film and the polarizer may be laminated with each other using a publicly known method.

For example, the lamination of the protective film and the polarizer may be obtained through an adhesion method using an adhesive. That is, first, an adhesive may be coated on a surface of the protective film of the polarizer or the PVA film, namely, a polarizer, using a roll coater, a gravure coater, a bar coater, a knife coater, a capillary coater or the like. The protective film and the polarizer may be thermally compressed or compressed at room temperature using a laminating roll before the adhesive is completely dried. When a hot melt adhesive is used, a heat pressing roll needs to be used.

When the protective film and the polarizing plate are combined with each other, a usable adhesive may be a one component-type PVA adhesive or a two component-type PVA adhesive, a polyurethane-based adhesive, an epoxy-based adhesive, a styrene butadiene rubber (SBR) adhesive, a hot melt type adhesive, or the like, but should not be considered to be limited thereto. When the polyurethane-based adhesive is used, a polyurethane-based adhesive produced using an aliphatic isocyanate-based compound not having an influence of light thereon may be used. When a one component-type or two component-type adhesive for dry lamination or an adhesive having comparatively low reactivity with isocyanate and a hydroxy group is used, a solution adhesive diluted by an acetate-based solvent, a ketone-based solvent, an ether-based solvent or an aromatic solvent may be used. Here, the viscosity of the adhesive may be relatively low at 5,000 cps or lower. The adhesives as described above may have light transmittance of 90% or above at 400 to 800 nm while having excellent storage stability.

A pressure-sensitive adhesive may also be used as long as it can exhibit relatively sufficient adhesive force. The pressure-sensitive adhesive may be sufficiently cured by heat or ultraviolet light after the lamination thereof to thereby improve mechanical strength thereof to an extent of an adhesive. Further, interface adhesive strength may also be relatively high to an extent to which delamination does not occur without breakage of one of both films having a pressure-sensitive adhesive adhered thereto.

As a detailed example of usable for the pressure-sensitive adhesive, there may be provided natural rubber, synthetic rubber, or an elastomer, a vinyl chloride/vinyl acetate copolymer, polyvinyl alkyl ether, polyacrylate or modified polyolefin pressure-sensitive adhesive, or the like, having excellent optical transparency, and may also be a curable pressure-sensitive adhesive having a hardener such as isocyanate or the like, added thereto.

In addition, according to an embodiment, a liquid crystal display device including the integrated polarizing plate may be provided.

At least one sheet of retardation film according to the embodiment of the inventive concept may also be provided between an integrated polarizing plate and a liquid crystal cell in a case in which the liquid crystal display device according to the embodiment includes the integrated polarizing plate described above.

MODE FOR INVENTION

Hereinafter, the inventive concept will be described in more detail based on the following embodiments. However, the embodiments are only for illustration of the inventive concept, but should not be construed as being limited thereto.

<Method of Measuring Physical Properties>

1. Retardation value: A retardation value of a film was measured using an Axoscan by Axometrics Inc.

2. Adhesive force: Adhesive force between the coating layer of the negative C-type material/the primer layer/the acrylic film was evaluated through a cross-cut test (ASTM3002). That is, when a cutter was applied to a suitable ruler or the like to draw a transverse line and a vertical line in a lattice form on a coating surface, five or more times, respectively, and then, an operation in which tape was attached and detached in a diagonal direction was repeatedly performed five times, the evaluation was carried out in an area in which a coating layer was delaminated. When the delaminated surface was 5% or more with regard to the entire area, it was determined as having defective adhesive force, when the delaminated surface ranged from 1 to 5%, as having good adhesive force, and when the delaminated surface was not delaminated at all, it was determined as having excellent adhesive force.

3. Solvent resistance: Solvent resistance of the primer layer was determined by a change in an in-plane retardation value (Rin) of the acrylic film after the coating with the negative C-type material. When the solvent resistance of the primer layer was not excellent, a solvent may have infiltrated into the acrylic film at the time of performing the coating of the negative C-type material to thus have caused deterioration in the retardation value. When a change in Rin before and after the coating was performed was 5 nm or lower, it was determined as being good in solvent resistance, and when the change in Rin before and after the coating was performed was higher than 5 nm, it was determined as being defective in solvent resistance.

<Embodiment 1>

Poly(cyclohexyl maleimide-co-methyl methacrylate) (PMMA 830HR by LG MMA Corp.) and styrene-acrylonitrile copolymer (SAN80HF supplied by LG Chemical Ltd., Acrylonitrile contained in the content of 24 wt %) were compounded at a weight ratio of 80:20, respectively, under conditions of 250° C. and 200 rpm, using a twin extruder to thereby prepare a resin composition. A non-stretched film having a width of 800 mm was produced using the resin composition, under the conditions of 250° C. and 250 rpm, using a T-die. The non-stretched film was stretched 1.5 times in a MD direction at a temperature of 125° C. in a roll-to-roll scheme and then stretched 3.0 times in the TD direction using a tenter stretching machine at the same temperature as above to thus produce an acrylic +B-plate. A thickness of the obtained stretched film was about 55 μm, a retardation value $R_{in}$ in the in-plane direction thereof and a retardation value $R_{th}$ in the thickness direction thereof were 110 nm and 174 nm, respectively.

A primer coating liquid was produced by strongly stirring a styrene-maleic anhydride copolymer (SMA) (Scripset 520 supplied by Hercules Inc., Styrene: maleic anhydride 1:1) in ethanol at a temperature of 70° C. for 4 hours to be dissolved therein. In this case, the solid content was 8%. The primer coating was performed by coating an upper surface of a base film with a primer coating liquid using a wire bar and then dried at 80° C. for 5 minutes. At this time, a coating thickness was around 1.2 μm.

A negative C-coating liquid was slowly dissolved by slowly stirring ethylcellulose (EC100 by Dow Chemical, MW 180 thousand, Ethoxyl content: 49%) in a mixed solvent of toluene/ethanol (3/7) at room temperature to be dissolved therein. In this case, the solid content was 10%. Completely dissolved coating liquid was coated on the acrylic film coated with primer using an applicator such that a final coating thickness became 12 μm, and then was dried at 80° C. for five minutes. A retardation value, adhesive force and solvent resistance of the manufactured final film were measured, and the results thereof are provided in Table 1.

As illustrated in Table 1, retardation values $R_{in}$ and $R_{th}$ of the entire retardation film were 108 nm and 66 nm, respectively, and a retardation film satisfying $R_{in} > R_{th}$ was able to be obtained. Further, it could be expected that $R_{th}$ of the coating layer of the negative C-type material was about 108 nm, from the change in $R_{th}$ provided before and after the negative C-type material coating thereof. The adhesive force between the negative C-type material coating layer and the base acrylic film was excellent, and it can be appreciated that since the change in $R_{in}$ before and after the coating thereof was around 2 nm, the solvent resistance of the primer layer was also good.

<Embodiment 2>

As illustrated in Table 1, the retardation film was manufactured using the same method as that of Embodiment 1 except for a retardation value of the acrylic film (a stretching rate, MD 1.4 times, TD 2.8 times), a primer layer thickness, a negative C-coating layer material (EC200 by Dow Chemical, Mw 240 thousand, Ethoxyl content: 49%) and thickness. A retardation value, adhesive force and solvent resistance of the manufactured final film were measured, and the results thereof are provided in Table 1.

<Embodiment 3>

The retardation film was manufactured using the same method as that of Embodiment 1 except that a retardation value of the acrylic film and a primer layer ingredient were changed. The primer coating liquid was produced by mixing a polyester-based polyurethane adhesive (CK-PU by Chokwang Paint) with ethylcellulose (EC100 by Dow Chemical at a weight ratio of 6:4. In this case, as a solvent, a mixed solvent of toluene/ethanol (3/7) was used, and the solid content was 8%. A retardation value, adhesive force and solvent resistance of the manufactured final film were measured, and the results thereof are provided in Table 1.

COMPARATIVE EXAMPLE 1

The retardation film was manufactured using the same materials and method as those of Embodiment 1 except that a negative C-coating was directly performed on the acrylic film without performing primer coating. A retardation value, adhesive force and solvent resistance of the manufactured final film were measured, and the results thereof are provided in Table 1. As illustrated in Table 1, $R_{in}$ of the acrylic film was significantly decreased by the solvent at the time of forming the negative C-coating, and the entire negative C-coating layer was peeled off at the time of the cross-cut test, and thus, adhesion also was poor.

COMPARATIVE EXAMPLE 2

The retardation film was manufactured using the same materials and method as those of Embodiment 1 except that the primer layer was coated using polyurethane dispersion. The polyurethane dispersion (CK-PUD by Chokwang Paint) was an anionic carbonate-based polyurethane dispersion, and the product in which a weight average molecular weight thereof was around 50,000 and the solid content was 10% was used. The coating was performed on the acrylic base film using a wire bar and then was dried at 90° C. for 5 minutes. A retardation value, adhesive force and solvent resistance of the manufactured final film were measured, and the results thereof are provided in Table 1. As illustrated in Table 1, the change in $R_{in}$ before and after the negative C-coating thereof was around 9 nm, and thus, the solvent resistance of the primer layer was not good, and the adhesive force with the acrylic base was also poor.

COMPARATIVE EXAMPLE 3

The retardation film was manufactured using the same materials and method as those of Embodiment 1 except for using a PVA adhesive as the primer layer. The primer coating was carried out by coating an upper surface of the acrylic base film with a PVA adhesive (Japan Synthetic Z-200 solution, 8% solids) using a wire bar and then was dried at 90° C. for 5 minutes. A retardation value, adhesive force and solvent resistance of the manufactured final film were measured, and the results thereof are provided in Table 1. As illustrated in Table 1, the solvent resistance of primer layer was good, but the entire negative C-coating layer was delaminated at the time of the cross-cut test, and thus, adhesion was poor.

TABLE 1

| | Acrylic Film | | | Primer Layer | | Negative C-coating Layer | | Entire Retardation Film | | | |
|---|---|---|---|---|---|---|---|---|---|---|---|
| | $R_{in}$ (nm) | $R_{th}$ (nm) | Thickness (μm) | Material | Thickness (μm) | Material | Thickness (μm) | $R_{in}$ (nm) | $R_{th}$ (nm) | Adhesion* | Solvent Resistance** |
| Embodiment 1 | 110 | 174 | 55 | SMA | 1.2 | EC100 | 12 | 108 | 66 | ◉ | ◯ |
| Embodiment 2 | 105 | 164 | 58 | SMA | 1.0 | EC200 | 9 | 104 | 78 | ◉ | ◯ |
| Embodiment 3 | 105 | 164 | 59 | SMA/PU | 1.2 | EC100 | 12 | 102 | 62 | ◯ | ◯ |
| Comparative | 110 | 174 | 55 | — | — | EC100 | 10 | 85 | 57 | X | X |

TABLE 1-continued

| | Acrylic Film | | | Primer Layer | | Negative C-coating Layer | | Entire Retardation Film | | | |
|---|---|---|---|---|---|---|---|---|---|---|---|
| | $R_{in}$ (nm) | $R_{th}$ (nm) | Thickness (μm) | Material | Thickness (μm) | Material | Thickness (μm) | $R_{in}$ (nm) | $R_{th}$ (nm) | Adhesion* | Solvent Resistance** |
| Example 1 | | | | | | | | | | | |
| Comparative Example 2 | 110 | 174 | 55 | PUD | 1.1 | EC100 | 10 | 101 | 95 | X | X |
| Comparative Example 3 | 110 | 174 | 55 | PVA | 1.0 | EC100 | 10 | 107 | 88 | X | ◯ |

*Adhesion Evaluation: ◎ Excellent, ◯ Good, X Poor
**Solvent Resistance Evaluation: ◯ Good, X Poor

The invention claimed is:

1. A retardation film comprising:
   1) an acrylic film comprising a resin blend of an acrylic resin and a copolymer resin containing an aromatic vinyl-based unit, wherein the copolymer resin containing an aromatic vinyl-based unit is a styrene-maleic anhydride copolymer (SMA), a styrene-acrylonitrile copolymer (SAN), or an α-methyl styrene-acrylonitrile copolymer (AMSAN), and the content of the aromatic vinyl-based unit is in a range of 10 to 25 wt % of the entire composition of the resin blend,
   2) a coating layer of a negative C-type material, wherein the C-type layer comprises a cellulose derivative having a weight average molecular weight of 100,000 to 300,000, and
   3) a primer layer including a copolymer containing an aromatic vinyl-based unit and a maleic acid-based unit, provided between, and in contact with, the acrylic film and the coating layer of the negative C-type material, wherein the copolymer has a weight average molecular weight of 50,000 to 1,000,000,
   wherein a retardation value $R_{in}$ of 1 the acrylic film in an in-plane direction thereof, represented by the following equation 1, is 50 to 200 nm, and a retardation value $R_{th}$ of 1) the acrylic film in a thickness direction thereof, represented by the following equation 2, is 50 to 250 nm:

$$R_{in}=(n_x-n_y)\times d \quad \text{Equation 1}$$

$$R_{th}=(n_z-n_y)\times d \quad \text{Equation 2}$$

where $n_x$ refers to the highest refractive index among refractive indexes in the in-plane direction of the film, $n_y$ refers to a refractive index in a direction perpendicular to the $n_x$ direction among refractive indexes in the in-plane direction of the film, $n_z$ refers to a refractive index in the thickness direction of the film, and d refers to a thickness of the film, and
   wherein 3) the primer layer has a thickness of 0.1 to 5 μm.

2. The retardation film of claim 1, wherein 1) the acrylic film has a thickness of 30 to 100 μm.

3. The retardation film of claim 1, wherein 2) the coating layer of the negative C-type material includes a compound comprising an aromatic ring or cyclo-olefin in a polymer main chain.

4. The retardation film of claim 1, wherein 2) the coating layer of the negative C-type material includes an ethyl cellulose resin.

5. The retardation film of claim 1, wherein 2) the coating layer of the negative C-type material has a retardation value $R_{in}$ of −5 to 5 nm in an in-plane direction thereof, represented by the following equation 1 and has a retardation value of −30 to −200 nm in a thickness direction thereof, represented by the following equation 2:

$$R_{in}=(n_x-n_y)\times d \quad \text{Equation 1}$$

$$R_{th}=(n_z-n_y)\times d \quad \text{Equation 2}$$

where $n_x$ refers to the highest refractive index among refractive indexes in the in-plane direction of the film, $n_y$ refers to a refractive index in a direction perpendicular to the $n_x$ direction among refractive indexes in the in-plane direction of the film, $n_z$ refers to a refractive index in the thickness direction of the film, and d refers to a thickness of the film.

6. The retardation film of claim 1, wherein 2) the coating layer of the negative C-type material has a thickness of 3 to 20 μm.

7. The retardation film of claim 1, wherein 3) the primer layer includes the aromatic vinyl-based unit in a content thereof ranging from 50 to 80 mol % and the maleic acid-based unit in a content thereof ranging from 20 to 50 mol %.

8. The retardation film of claim 1, wherein 3) the copolymer containing the aromatic vinyl-based unit and the maleic acid-based unit in the primer layer is a styrene-maleic anhydride copolymer (SMA).

9. A liquid crystal display device comprising the retardation film of claim 1.

10. The liquid crystal display device of claim 9, wherein the liquid crystal display device is an in-plane switching (IPS) mode liquid crystal display device.

11. An integrated polarizing plate comprising a polarizer and the retardation film of claim 1, provided as a protective film, on a single surface or both surfaces of the polarizer.

12. A liquid crystal display device comprising the integrated polarizing plate of claim 11.

13. The retardation film of claim 1, wherein the cellulose derivative is ethyl cellulose resin.

14. The retardation film of claim 13, wherein ethyl cellulose resin has an ethoxyl content of 40% to 50%.

15. A method of manufacturing a retardation film comprising:
   a) preparing an acrylic film comprising a resin blend of an acrylic resin and a copolymer resin containing an aromatic vinyl-based unit,
      wherein the copolymer resin containing an aromatic vinyl-based unit is a styrene-maleic anhydride copolymer (SMA), a styrene-acrylonitrile copolymer (SAN), or an α-methyl styrene-acrylonitrile copolymer (AMSAN), and the content of the aromatic vinyl-based unit is in a range of 10 to 25 wt % of the entire composition of the resin blend,
   b) forming a primer layer by coating at least one surface of the acrylic film with a composition including a copolymer containing an aromatic vinyl-based unit and a maleic acid-based unit and having a weight average molecular weight of 50,000 to 1,000,000, and c) coating an upper part of the primer layer with a negative C-type material, wherein the C-type material comprises a cellulose derivative having a weight average molecular weight of 100,000 to 300,000, wherein a) a retardation value $R_{in}$ of the acrylic film in an in-plane direction thereof, represented by the following equation 1, is 50 to 200 nm, and a retardation value $R_{th}$ of the acrylic film in a thickness direction thereof, represented by the following equation 2, is 50 to 250 nm:

$$R_{in} = (n_x - n_y) \times d \quad \text{Equation 1}$$

$$R_{th} = (n_z - n_y) \times d \quad \text{Equation 2}$$

where $n_x$ refers to the highest refractive index among refractive indexes in the in-plane direction of the film, $n_y$ refers to a refractive index in a direction perpendicular to the $n_x$ direction among refractive indexes in the in-plane direction of the film, $n_z$ refers to a refractive index in the thickness direction of the film, and d refers to a thickness of the film, and wherein b) the primer layer has a thickness of 0.1 to 5 μm.

* * * * *